United States Patent
Sheppard et al.

(10) Patent No.: US 11,784,810 B2
(45) Date of Patent: Oct. 10, 2023

(54) PERFORMING KEY SERVER REDUNDANCY VERIFICATION TO VERIFY A KEY IS OBTAINED FROM REDUNDANT KEY SERVERS

(71) Applicant: INTERNATIONAL BUSINESS MACHINES CORPORATION, Armonk, NY (US)

(72) Inventors: Jacob Lee Sheppard, Corona De Tucson, AZ (US); Roger G. Hathorn, Tucson, AZ (US); Igor Popov, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/804,069

(22) Filed: May 25, 2022

(65) Prior Publication Data
US 2022/0286284 A1    Sep. 8, 2022

Related U.S. Application Data

(63) Continuation of application No. 16/816,148, filed on Mar. 11, 2020, now Pat. No. 11,405,199.

(51) Int. Cl.
*H04L 9/08* (2006.01)
*H04L 9/32* (2006.01)

(52) U.S. Cl.
CPC .......... *H04L 9/0894* (2013.01); *H04L 9/083* (2013.01); *H04L 9/0891* (2013.01); *H04L 9/3268* (2013.01)

(58) Field of Classification Search
CPC ..... H04L 9/0894; H04L 9/083; H04L 9/0891; H04L 9/3268
(Continued)

(56) References Cited

U.S. PATENT DOCUMENTS 7,181,766 B2    2/2007    Bendinelli et al.
7,440,573 B2    10/2008   Lor et al.
(Continued)

OTHER PUBLICATIONS

Albeanu et al., "Web software reliability engineering." Reliability: Theory Applications 4.4, 2009, pp. 18. [online] https://cyberleninka.ru/article/n/web-software-reliability-engineering.
(Continued)

*Primary Examiner* — Kambiz Zand
*Assistant Examiner* — Phuc Pham
(74) *Attorney, Agent, or Firm* — KONRAD RAYNES DAVDA & VICTOR LLP; David W. Victor

(57) ABSTRACT

Provided are a computer program product, system, and method for determining key server type and key server redundancy information to enable encryption. A first key server type for a first protocol is indicated in a key server type field in response to determining a current protocol used to communicate with the key server comprises the first protocol. A query information request is submitted to the key server to determine a key server type in response to determining that the current protocol comprises the second protocol. The second key server type indicated in the response to the query information request is indicated in the key server type field in response to the response indicating the second key server type. The first or second type of key server indicated in the key server type field is used to determine information to include in a key retrieval request.

21 Claims, 8 Drawing Sheets

(58) Field of Classification Search
USPC .................................................. 380/277
See application file for complete search history.

(56) References Cited

U.S. PATENT DOCUMENTS

| | | | |
|---|---|---|---|
| 10,453,058 | B2 | 10/2019 | Bartley et al. |
| 2007/0147380 | A1 | 6/2007 | Ormazabal et al. |
| 2011/0261964 | A1* | 10/2011 | Kahler ............... H04L 9/083 380/44 |
| 2013/0044878 | A1* | 2/2013 | Rich .................. H04L 9/083 380/277 |
| 2019/0238331 | A1* | 8/2019 | Chandra ............ H04L 9/0861 |
| 2019/0342079 | A1* | 11/2019 | Rudzitis ............ G06F 21/72 |
| 2020/0076585 | A1 | 3/2020 | Sheppard et al. |
| 2020/0076807 | A1 | 3/2020 | Driever et al. |

OTHER PUBLICATIONS

Dufrasne, et al., "IBM DS8000 Encryption", IBM Corporation, RedPaper, Document No. REDP-4500-0, Jan. 2020, pp. 218.

Foukalis et al., "Cross-layer design proposals for wireless mobile networks: a survey and taxonomy." IEEE Communications Surveys Tutorials, 1st Quarter 2008, vol. 10, No. 1, pp. 16.

Jordan et al. "Enabling pervasive encryption through IBM Z stack innovations." IBM Journal of Research and Development 62.2/3, 2018, pp. 11.

U.S. Appl. No. 16/816,148 filed Mar. 11, 2022.

Office Action1 dated Jul. 6, 2021, pp. 38, for U.S. Appl. No. 16/816,148.

Response dated Oct. 6, 2021, pp. 22, to Office Action1 dated Jul. 6, 2021, pp. 38, for U.S. Appl. No. 16/816,148.

Final Office Action1 dated Nov. 22, 2021, pp. 37, for U.S. Appl. No. 16/816,148.

Response dated Jan. 6, 2022, pp. 19, to Final Office Action1 dated Nov. 22, 2021, pp. 37, for U.S. Appl. No. 16/816,148.

Notice Allowance dated Mar. 28, 2022, pp. 13, for U.S. Appl. No. 16/816,148.

List of Patents or Patent Applications Treated as Related, dated May 25, 2022, pp. 2.

* cited by examiner

Key Server Type Information Rule

Verification Redundancy Status Rule

Key Information

PERFORMING KEY SERVER REDUNDANCY VERIFICATION TO VERIFY A KEY IS OBTAINED FROM REDUNDANT KEY SERVERS

BACKGROUND OF THE INVENTION

1. Field of the Invention

The present invention relates to a computer program product, system, and method for determining key server type and key server redundancy information to enable encryption.

2. Description of the Related Art

A key manager program deployed in a computational system, such as a storage controller or other computing system, may have the capability to communicate with different key server system types and vendors to allow the computational system to interact with different types of key servers that may be available. The computational system may require that the key server systems with which it communicates have redundant key servers to ensure that the encryption key can still be accessed even if one of the key servers are down or offline to maintain continued access to encryption keys that are needed to encrypt and decrypt data, such as customer data in an enterprise storage environment.

To obtain the necessary information for a key management request, the key manager in the computational system or storage controller, will query the key server system to obtain key server type and redundancy information for each key management request, and use that information to determine parameters to include in a key management request operation to the key server system. However, the time for the key server system to respond to this request may result in latency in the key manager completing a key management request, which may be significant if the redundancy of key servers at the key server system needs to be verified.

There is a need in the art for improved techniques for accessing and maintaining key server information to reduce latency in issuing key management operation requests.

SUMMARY

Provided are a computer program product, system, and method for determining key server type and key server redundancy information to enable encryption. A determination is made whether a current protocol used to communicate with the key server comprises a first protocol or a second protocol. A first key server type for the first protocol is indicated in a key server type field in response to determining the current protocol comprises the first protocol. A query information request is submitted to the key server to determine a key server type in response to determining that the current protocol comprises the second protocol. In response to receiving a response to the query information request, a determination is made as to whether the response indicates a second key server type. The second key server type indicated in the response is indicated in the key server type field in response to the response indicating the second key server type. The first or second type of key server indicated in the key server type field is used to determine information to include in a key retrieval request to submit to the key server to obtain an encryption key to use for operations.

With the above embodiment, the protocol used to communicate with the key server is used to determine the key server type so that the key server type may be saved and later used for the key retrieval request that is submitted to the key server to obtain the encryption key. By determining and saving the key server type field, the key manager avoids having to continually request the key server type each time the key is retrieved. In this way, latency is substantially reduced for key retrieval requests.

In a further embodiment, key requests are sent to two key servers in response to the key server type field indicating the first key server type as part of a verification of key server redundancy. Key server redundancy is verified in response to obtaining the key from at least two key servers and the key server type field indicating the second key server type. A redundancy information request is sent to the key server to request a redundancy status at the key server in response to the key server type field indicating the second key server type. Verification of the key server redundancy is failed in response to not receiving keys in response to the key requests to the two key servers or from the redundancy information request not yielding a confirmation of key server redundancy.

With the above embodiment, key server redundancy is determined when submitting the key request to determine whether to continue with encryption enablement or fail the encryption enablement.

In a further embodiment, a get key request is sent to configured key servers after indicating in the key server type field the first or second key server type. Verification of key server redundancy is indicated in response to receiving a key from each of the configured key servers and determining one of whether the key server type is the first key server type and the current protocol comprises the second protocol.

With the above embodiment, information on the previously obtained key server type and current protocol to communicate with the key servers is used to determine whether the key server redundancy can be verified when a key is received from each key server to which the get key request is sent. Verification of key server redundancy under these circumstances allow the encryption enablement process to continue to further steps to complete encryption enablement.

In a further embodiment, after indicating in the key server type field the first or second key server type, a query information request is submitted to the key server to determine key server redundancy status in response to determining that the current protocol comprises the first protocol. An error is indicated in response to a response to the query information request not indicating the key server redundancy status. An error is also indicated in response to the response to the query information indicating that a key is not replicated to redundant key servers.

With the above embodiment, a query information request on key server redundancy is sent for the first protocol. The above embodiment provides conditions under which an error are indicated when key server redundancy status cannot be confirmed from the query information request. Raising the error may be determined during a health check procedure indicating that the health of the encryption capabilities is in question.

In a further embodiment, the determining whether the current protocol comprises the first or second protocol, indicating in the key server type field the first key server type, submitting the query information request to the key server, determining whether the response indicates the second key server type, and indicating in the key server type field the second key server type are performed as part of execution of a cold boot procedure in which encryption is indicated as enabled. The key is obtained after indicating the first or second key server type in the key server type field. An encryption state is set to accessible in response to receiving the key in response to the key retrieval request. The encryption state to is set inaccessible in response to not receiving the key in response to the key retrieval request or in response to the response not indicating the second key server type.

With the above embodiment, the process for obtaining the key server type may be performed during a cold boot procedure to obtain this information that may be later used during encryption enablement. Further, during cold boot, the encryption state may be indicated as inaccessible or accessible based on whether a key is received in response to a key retrieval request send after storing the key server type during the cold boot.

Further provided, are a computer program product, system, and method for obtaining key server information to use to communicate with a key server. For each protocol of a plurality of protocols, a key server information rule is provided indicating an action to take to identify a key server for an associated protocol. A first key server information rule indicates a first key server type for a first protocol, and a second key server information rule indicates a submit query information request to a key server for a second protocol. The first key server type for the first protocol indicated in the first key server information rule is indicated in a key server type field in response to determining a current protocol used to communicate with the key server comprises the first protocol. A query information request is submitted to the key server indicated in the second key server information rule in response to determining that the current protocol comprises the second protocol. The first or second type of key server indicated in the key server type field is used to determine information to include in a key retrieval request to submit to the key server to obtain an encryption key to use for operations.

With the above embodiment, a key server information rule is sued to determine the operation to perform to determine the key server type based on whether the current protocol used is a first or second protocol. Once the key server type is indicated and saved in the key server type field, that information on the key server type may be used for key retrieval requests to reduce the time required to perform the key retrieval request.

DETAILED DESCRIPTION

There are three types of processes to retrieve keys. One is key generation where key redundancy status of the key server is required. A redundancy check is required because the system and customers may require that a new key is replicated in multiple key server locations to provide key redundancy. A second process to retrieve keys is key retrieval for key use. During key retrieval for key use, redundancy is not required because all that is required is the key from a key server system whose redundancy may have been previously verified. A third process to retrieve keys is for diagnostics. During key retrieval for diagnostics, redundancy status is collected and key redundancy failures can result in problems being raised and customers being notified of the condition.

Performing a key server information query prior to every key retrieval, including key retrieval for key use, results in latency waiting for the results of the information query. Further, in certain situations where a key server fails to return the response to the query for a timeout period, the storage device key server client may fail the key retrieval request due to the query failure when in fact a lone key retrieval operation would succeed.

Described embodiments provide improvements to computer key management request operations by providing rules to determine a key server type based on a protocol being used to communicate with a key server system, such as one rule specifying the key server type for a specific protocol and another rule indicating to submit a query for information to the key server system to obtain information on the key server type. This information on the key server type may then be later used to determine parameters to include in a key management request to the key server system, such as a request for the encryption key to use for operations.

Further, before a key server system may be used, the redundancy at the key server system may need to be determined before use so that customers are assured that encryption keys are being replicated in redundant key servers. Described embodiments provide improvements to computer technology for determining redundancy status at a key sever based on the key server type and communication protocol with the key server.

Figure 1:
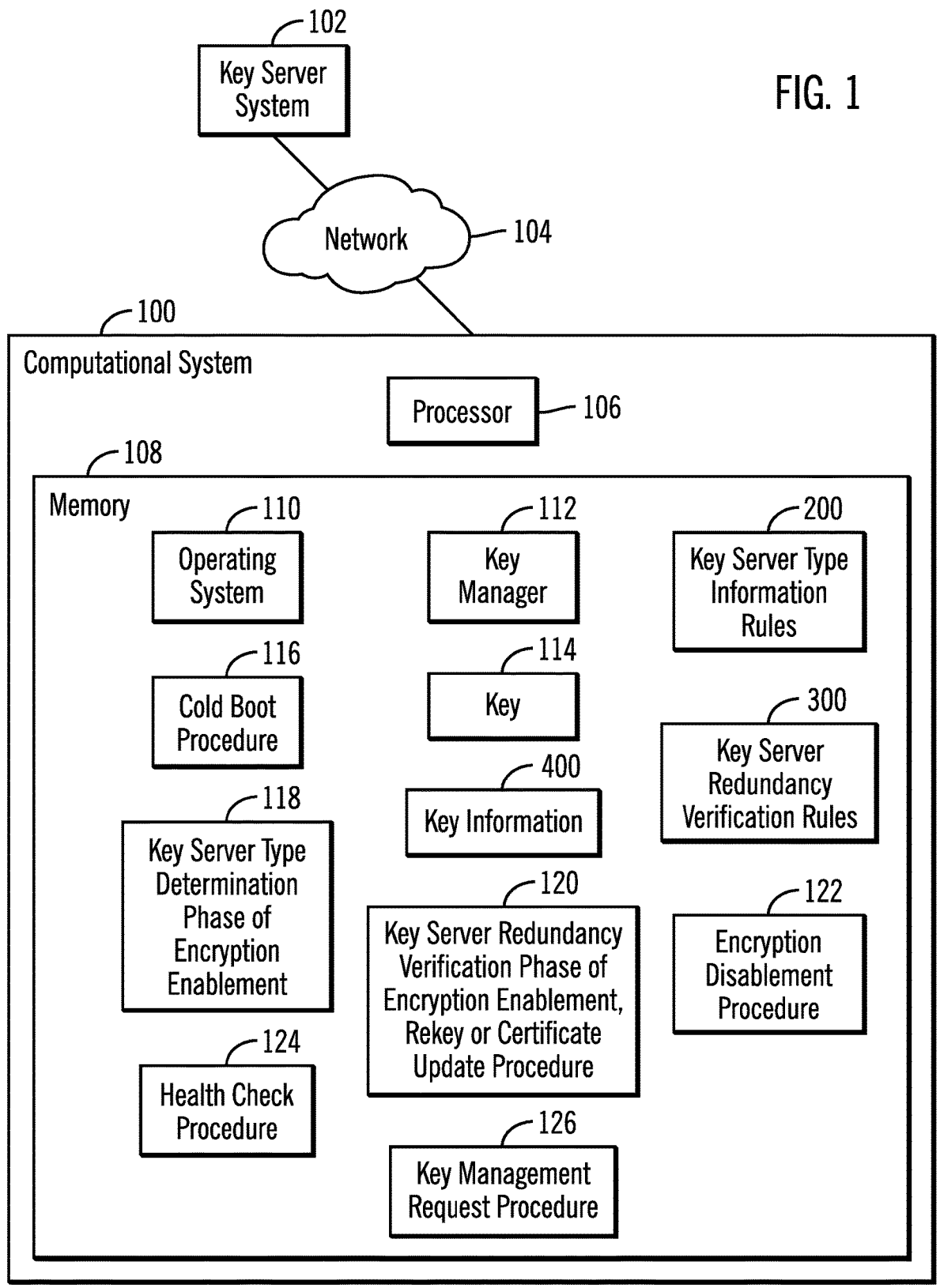
FIG. 1 illustrates an embodiment of a computational system in a key server environment.

FIG. 1 illustrates an embodiment of a key server encryption environment having a computational system 100 in communication with a key server system 102 over a network 104. The key server system 102 may include redundant key servers and a key database to provide encryption keys to different computational systems. The computational system 100 includes a processor 106 and a memory 108 including programs executed by the processor 106. The memory 108 includes an operating system 110 to manage the computational system 100 operations and storage devices and a key manager 112 to perform encryption key management operations to obtain an encryption key 114 from the key server system 102. The key manager 112 maintains key server type information rules 200 having rules to determine a key server type of the key server system 102 from which keys 114 are being obtained and key server redundancy verification rules 300 to verify redundancy of key servers in the key server system 102 for different key server types. The key manager 112 further maintains key information 400 having information on obtained encryption keys used to encrypt data for the computational system 100.

The key manager 112 may initiate different procedures to determine the operability of the key server system 102 and manage encryption keys, including a cold boot procedure 116 that is performed after the computational system 100 is powered-on, a key server type determination phase of encryption enablement 118 to determine the key server type for encryption enablement, an encryption enablement verification redundancy status procedure 120 to verify redundancy status of the key server system 102, an encryption disablement procedure 122 to disable encryption, a health check procedure 124 to determine a health of the key server system 102, and a key management request procedure 126 to request an encryption key 114 from the key server system 102 to use for encryption operations.

In one embodiment, the computational system 100 may comprise a dual node computational system, such as a storage controller having two processor nodes. In such systems, the cold boot procedure 116 may be performed after the code at each of the dual nodes is upgraded to code that stores key server type information locally.

The program components in the memory 108, including 110, 112, 116, 118, 120, 122, 124, and 126, are shown in FIG. 1 as program code loaded into the memory 108 and executed by the processor 106. Alternatively, some or all of the components functions may be implemented in hardware devices, such as in Application Specific Integrated Circuits (ASICs), Field Programmable Gate Array (FPGA) or executed by separate dedicated processors.

The memory 108 may comprise one or more memory or storage volatile or non-volatile devices, such as a Dynamic Random Access Memory (DRAM), a phase change memory (PCM), Magnetoresistive random-access memory (MRAM), Spin Transfer Torque (STT)-MRAM, SRAM storage devices, DRAM, a ferroelectric random-access memory (FeTRAM), nanowire-based non-volatile memory, and Non-Volatile Direct In-Line Memory Modules (DIMMs), NAND storage, e.g., flash memory, Solid State Drive (SSD) storage, non-volatile RAM, etc. The memory 108 may further include hard disk drives or virtual memory The network 104 may comprise one or more interconnected networks, such as a Local Area Network (LAN), Storage Area Network (SAN), Wide Area Network (WAN), peer-to-peer network, wireless network, the Internet, an intranet, etc.

Figure 2:
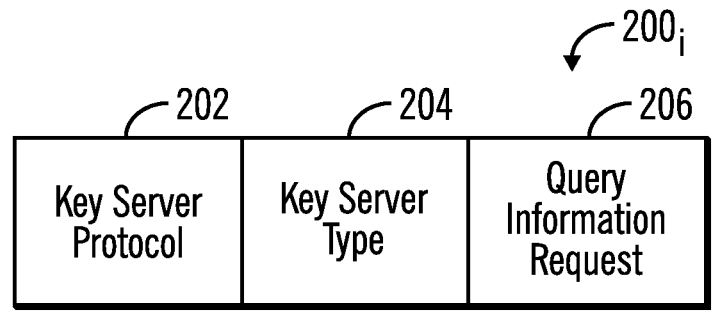
FIG. 2 illustrates an embodiment of an instance of a key server type information rule.

FIG. 2 illustrates an embodiment of an instance of a key server type information rule $200_i$ in the key server type information rules 200 used to determine a key server type of the connected key server system 102, including: a key server protocol 202 indicating a current protocol the key manager 112 uses to communicate with the key manager system 102; a key server type 204 of the key server system 102 if there is a specific key server type provided for the key server protocol 202; and a query information request 206 to submit to the key server system 102 to determine the key server type of the key server system 102 if a key server type 204 is not provided.

For instance, the key server protocol 202 may indicate International Business Machines Corporation's ("IBM") proprietary protocol ("IPP") or Key Management Interoperability Protocol ("KMIP"). One key server type information rule $200_i$ may indicate that if the protocol 202 is IPP, such as a first protocol, then the key server type 204 may specify "IBM Security Key Lifecycle Manager ("SKLM") using IPP", a first key server type. Another key server type information rule $200_i$ may indicate that if the protocol 202 is KMIP, a second protocol, then there is no key server type 204, but a query information request 206 to submit to the key server 102 using the KMIP protocol to determine the key server type of the key server 102, such as a second key server type. (IBM and INTERNATIONAL BUSINESS MACHINES CORPORATION are registered trademarks of International Business Machines Corporation throughout the world.

Examples of key server types that may be indicated include, but are not limited to: unknown, generic KMIP, IBM SKLM using KMIP, SafeNet KeySecure, Thales keyAuthority, IBM SKLM using IPP, etc. (SafeNet KeySecure and Thales keyAuthority are products offered by Thales eSecurity, Inc.)

Figure 3:
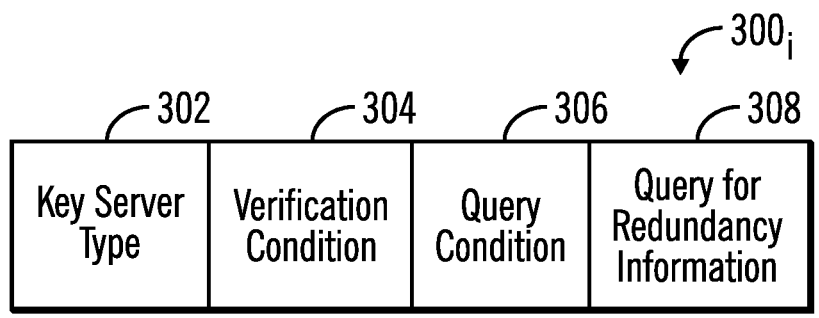
FIG. 3 illustrates an embodiment of an instance of a verification redundancy status rule.

FIG. 3 illustrates an embodiment of an instance of a verification redundancy status rule $300_i$ in the verification redundancy status rules 300 used to determine the redundancy status of whether a key is replicated to multiple key servers in the key server 102, including: a key server type 302, such as determined by the cold boot procedure 116 or the encryption enablement key server type information procedure 118; a verification condition 304, such as a protocol and/or key server type condition, that if satisfied indicates there is redundancy if keys are retrieved from multiple key servers in the key sever system 102; a query condition 306, such as a protocol and/or key server type condition, that if satisfied indicates a query 308 to send to the key server system 102 to determine the redundancy status.

For instance, a verification redundancy status rule $300_i$ may specify a verification condition 304 that if the key server type 302 is "IBM SKLM using IPP", then redundancy is verified if multiple keys are retrieved from the key server system 102; a verification condition 304 that if the key server type 302 is "IBM SKLM using KMIP" and the protocol 202 is KMIP, then redundancy is verified if multiple keys are retrieved from the key server system 102; a query condition 306 that if the key server type 302 is "IBM SKLM using KMIP", then a query for redundancy information 308 is sent to the key server 102 to obtain a response including the redundancy status at the key server system 102.

Figure 4:
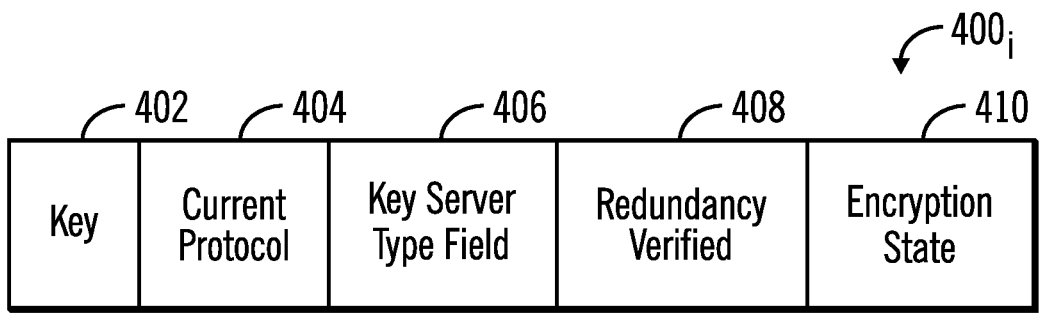
FIG. 4 illustrates an embodiment of key information.

FIG. 4 illustrates an embodiment of an instance of key information $400_i$ the key manager 112 maintains for a key 114 being accessed from the key server system 102, and includes: an identifier of the key 402; a current protocol 404 used to communicate with the key server system 102, e.g., IPP, KMIP, etc.; a key server type field 406 determined according to the cold boot procedure 116 or encryption enablement key server type information procedure 118; a redundancy verified field 408 indicating whether there is redundancy of key server devices in the key server system 102; and an encryption state 410 indicating whether encryption is accessible or inaccessible.

Figure 5:
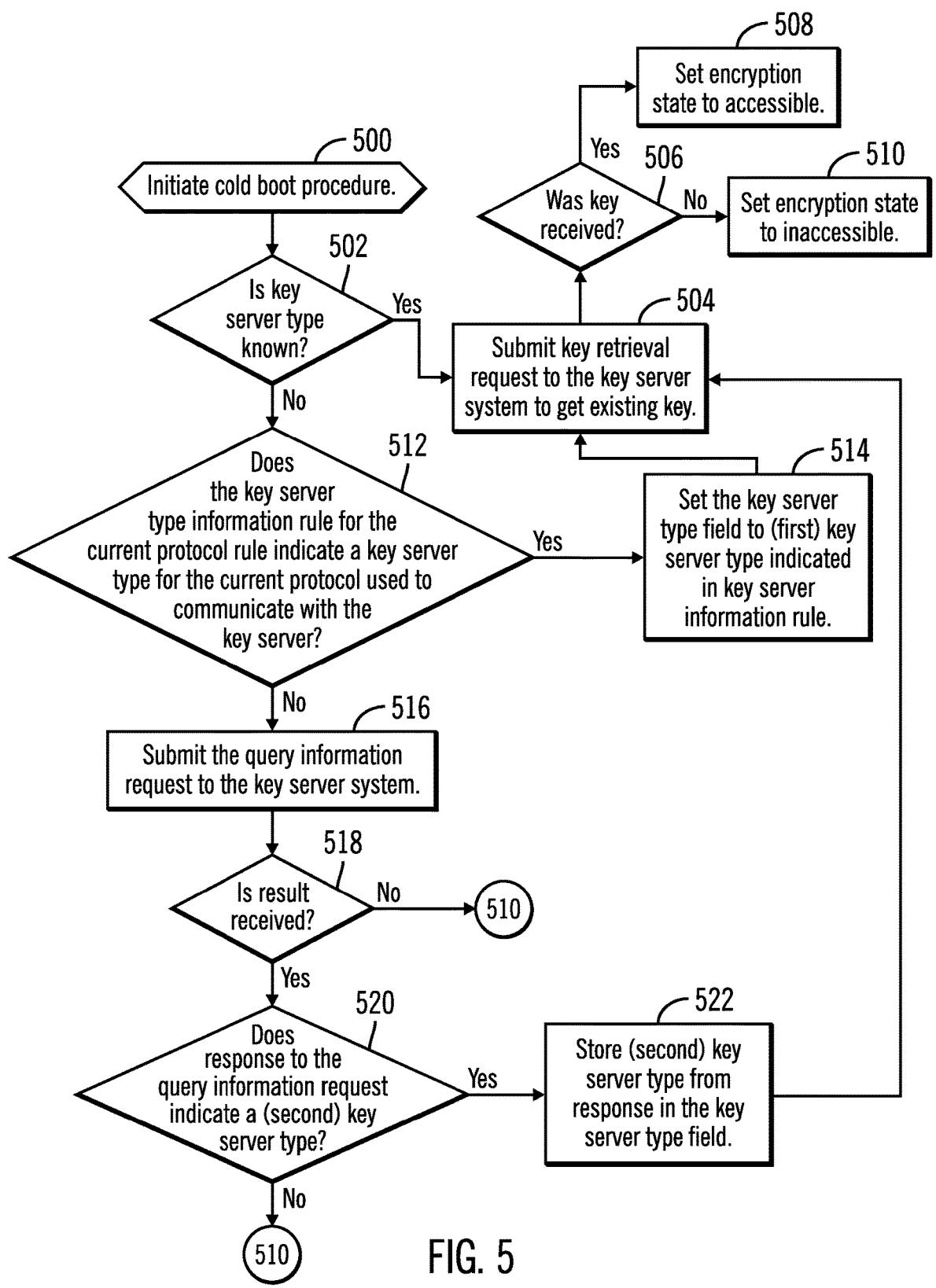
FIG. 5 illustrates an embodiment of operations to perform a cold boot procedure to obtain key server type information.

FIG. 5 illustrates an embodiment of operations performed by the key manager 112 executing the cold boot procedure 116 after a system powers-up to discover a key server type of the key server system 102 used to obtain encryption keys. Upon initiating (at block 500) the cold boot procedure 116, if (at block 502) the key server type is known, such as indicated in the key server type field 406, then control proceeds (at block 504) to submit a key retrieval request to the key server system 102 to get an existing key. If (at block 506) a key 114 is received in response to the key retrieval request, then the encryption state 410 is set (at block 508) to accessible, otherwise if no key 114 is received in response to the key retrieval request, then the encryption state 410 is set (at block 510) to inaccessible.

If (at block 502) the key server type 406 is unknown, i.e., key server type field 406 indicates unknown, and if (at block 512) the key server type information rule $200_i$ for the current protocol 404, i.e., having the key server protocol 202 matching the current protocol 404, which may be a first protocol, indicates a key server type 204 for the current protocol 404, then the key manager 112 sets (at block 514) the key server type field 406 to the key server type 204 indicated in the key server type information rule $200_i$ for the current protocol 404, or a first key server type, and control proceeds (at block 504) for further procedures.

If (at block 512) the key server type information rule $200_i$ for the current protocol 404, i.e., protocol field 202 is the current protocol 404, for a second protocol, does not indicate a key server type 204 and instead indicates a query information request 206, then the key manager 112 submits (at block 516) the query information request 206 to the key server system 102. If (at block 518) the result to the query at block 516 is not received, then control proceeds to block 510 to set the encryption state 410 to inaccessible. If (at block 518) the result to the query information request is received, then a determination is made (at block 520) whether the response to the query information request 206 indicates a key server type. If (at block 520) a key server type is indicated, such as a second key server type, then the indicated key server type is stored (at block 522) in the key server type field 406. Control proceeds to further checking at block 504 from block 520. If (at block 518) the response does not indicate a key server type, then control proceeds to block 510 to indicate the encryption state 410 is inaccessible.

With the embodiment of operations of FIG. 5, the cold boot procedure 116 determines the key server type information based on the key server type information rules 200 for the current protocol 404 being used by the key manager 112. The rule $200_i$ may specify a specific key server type for the current protocol 404 or a query to use to obtain that information from the key server system 102. This saved key server type information may then be later used to determine the fields and parameters to encode in key requests submitted to the key server system 102 without having to query the key server system 102 for the key server type when building a key management operation, such as a get key request. Further, if the key server type is determined and a key is retrieved, then encryption state 410 can be indicated as accessible during the cold boot procedure. This can substantially reduce latency in generating a key management operation requests because the time required to obtain the key server type is avoided by previously obtaining this information during a cold boot procedure 116.

Figure 6:
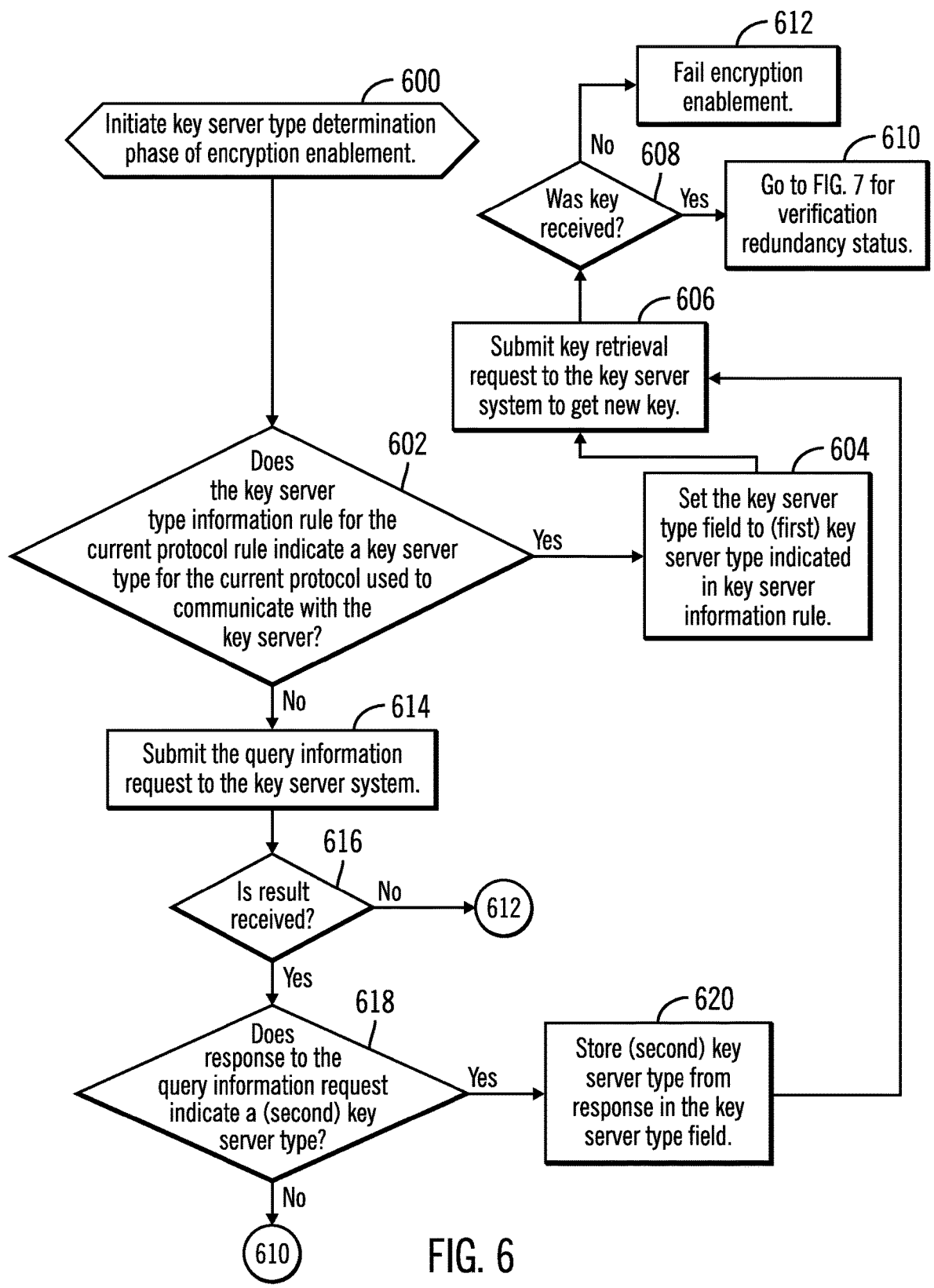
FIG. 6 illustrates an embodiment of operations to initiate encryption enablement to determine the key server type.

FIG. 6 illustrates an embodiment of operations during the key server determination phase of encryption enablement procedure 118 executed by the key manager 112 to determine a key server type as part of encryption enablement. In response to initiating (at block 600) encryption enablement key server type information procedure 118, if (at block 602) the key server type information rule $200_i$ for the current protocol 404, i.e., having the key server protocol 202 matching the current protocol 404, indicates a key server type 204 for the current protocol 404, then the key manager 112 sets (at block 604) the key server type field 406 to the key server type 204 indicated in the key server type information rule $200_i$ for the current protocol 404 and control proceeds to block 606 to submit the key retrieval request.

Figure 7:
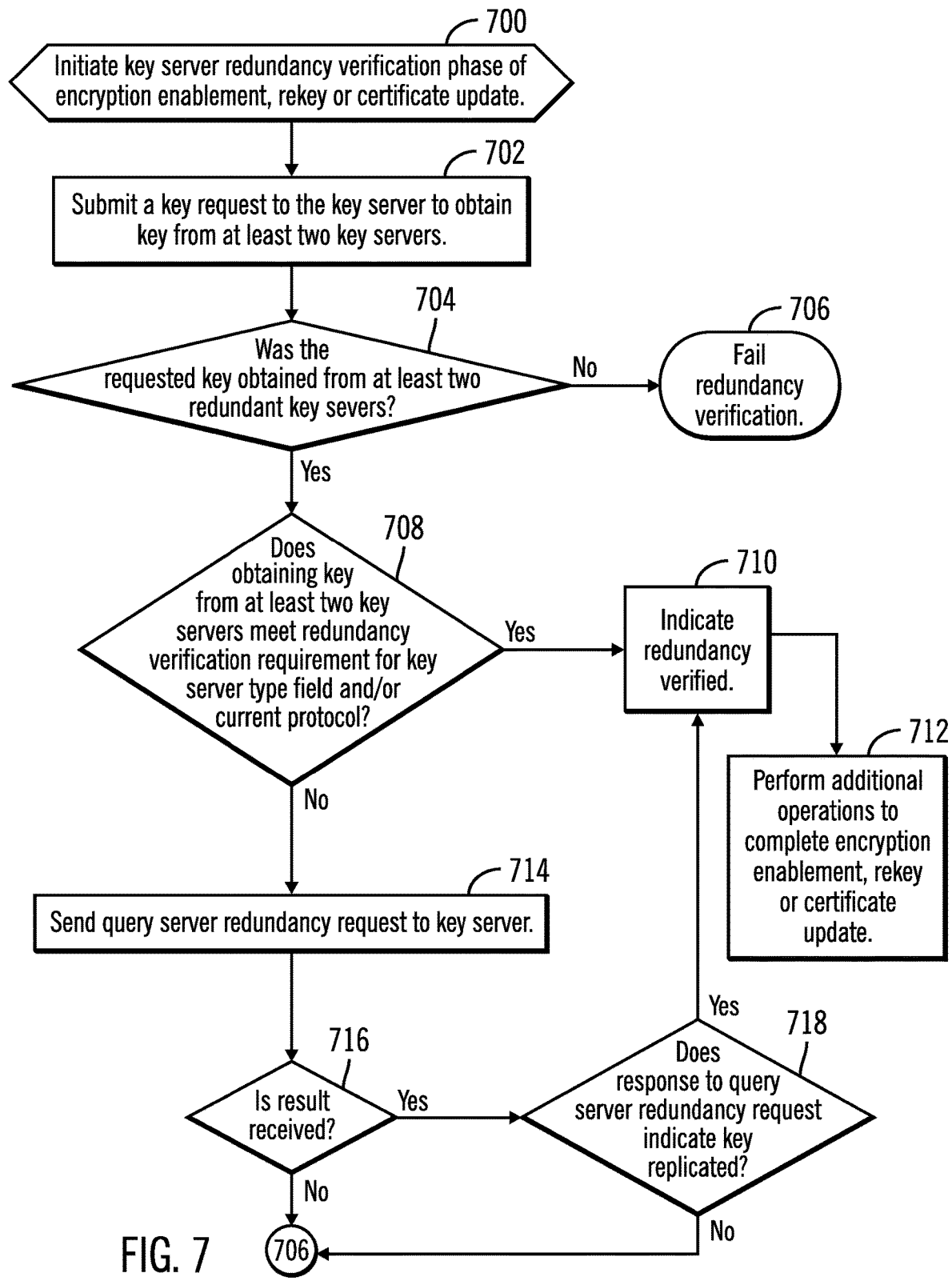
FIG. 7 illustrates an embodiment of operations to initiate encryption enablement to verify redundancy status of the key server.

If (at block 608) a key 114 is received in response to the key retrieval request, then control proceeds (at block 610) to FIG. 7 to perform the verify the redundancy status at the key server system 112 as part of the encryption enablement verification redundancy status procedure 120. Otherwise if (at block 608) no key 114 is received in response to the key retrieval request, then the encryption enablement process is failed (at block 612).

If (at block 602) the key server type information rule $200_i$ for the current protocol 404, i.e., protocol field 202 is the current protocol 404, does not indicate a key server type 204 and instead indicates a query information request 206, then the key manager 112 submits (at block 614) the query information request 206 to the key server system 102. If (at block 616) the result to the query at block 616 is not received, then control proceeds to block 612 to fail encryption enablement. If (at block 616) the result to the query information request is received, then a determination is made (at block 618) as to whether the response to the query information request 206 indicates a key server type. If (at block 618) a key server type is indicated, then the indicated key server type is stored (at block 620) in the key server type field 406. Control proceeds to block 606 from block 620 to submit the key retrieval request. If (at block 618) the response does not indicate a key server type, then control proceeds to block 610 to fail encryption enablement.

FIG. 7 illustrates an embodiment of operations of the initiate a key server redundancy verification phase of encryption enablement, rekey or certificate update procedure 120 executed by the key manager 112 to determining the redundancy status at the key server system 102. Upon initiating (at block 700) the procedure 120, a key request is submitted (at block 702) to the key server system 102 to obtain a key from at least two redundant key servers at the key server system 102. If (at block 704) the requested key is not received from the at least two redundant servers, then the redundancy verification fails (at block 706) and failure is indicated in the redundancy verified field 408. If (at block 704) the requested key is obtained from at least two redundant key servers, then the key manager 112 determines (at block 708) whether obtaining a key from at least two key servers meets a redundancy verification requirement, of a verification redundancy status rule $300_i$, for key server type field 406 and/or current protocol 404. For instance, the verification condition 304 may specify conditions for the key server type and/or protocol under which receiving requested keys results in a determination that the redundancy status is verified. If (at block 708) the verification condition 304 is satisfied, i.e., key server type 406 and/or 404 protocol condition satisfied when the requested keys are obtained, then redundancy verified is indicated (at block 710) in the redundancy verified field 408. Additional operations are performed (at block 712) to complete encryption enablement or other requested operations, such as a rekey operation to obtain a new encryption or a certificate update.

If (at block 708) there is no verification requirement met by obtaining key from at least two key servers, verification condition 304 satisfied in one of the verification redundancy status rules 300, then the key manager 112 sends (at block 714) the query for redundancy information 308, indicated in the verification redundancy status rule $300_i$ having the satisfied query condition 306, to the key server system 102. If (at block 716) there is no verification redundancy rule $300_i$ having a satisfied query condition 306, then control proceeds to block 706 to indicate fail of redundancy verification.

If (at block 716) a result to the query is received and if (at block 718) the response to the query server redundancy request indicates the key was replicated, i.e., there is key server redundancy at the key server system 102, then control proceeds to block 710 to indicate redundancy verified. If (at block 718) the response to the query of server redundancy is not received, then control proceed to block 706 to indicate failure of redundancy status.

With the embodiment of operations of FIG. 7, the key manager 112 performs a redundancy verification to determine based on different factors whether the key server system 102 provides redundancy of key servers, which may be a requirement for certain applications, customers, and operations. The factors considered in the verification redundancy status rules may be based on whether the same key is retrieved from multiple redundant key servers of the key server system 102 and the key server satisfies a protocol 404 and/or key server type 406 conditions or based on a query condition based on protocol 404 and/or key server type 406 to determine whether the key server system 102 should be queried for information on key server redundancy. The query 308 sent may cause the key server system 102 to perform a key replication test to verify that the key can be retrieved from multiple key servers at the key server system 102 to respond to the query 308. This redundancy may be required before encryption is enabled if the computational system requires redundancy at the key server system 102 before encryption is enabled.

Figure 8:
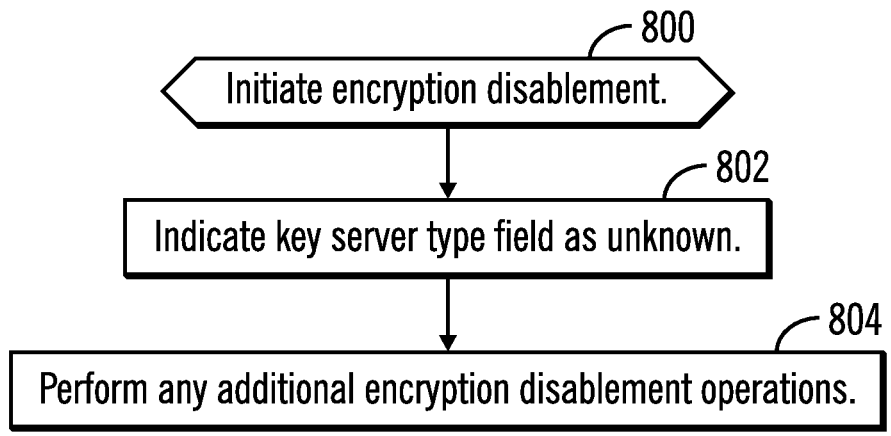
FIG. 8 illustrates an embodiment of operations to initiate encryption de-enablement to disable encryption.

FIG. 8 illustrates an embodiment of operations of the encryption disablement procedure 122 executed by the key manager 112 to disable encryption. Upon initiating (at block 800) the encryption disablement procedure 122, the key server type field 406 is indicated as unknown, and any additional encryption disablement operations are performed (at block 804).

With the embodiment of FIG. 8, encryption is disabled by setting the key server type field 406 to unknown, which prevents encryption related operations from being performed.

Figure 9:
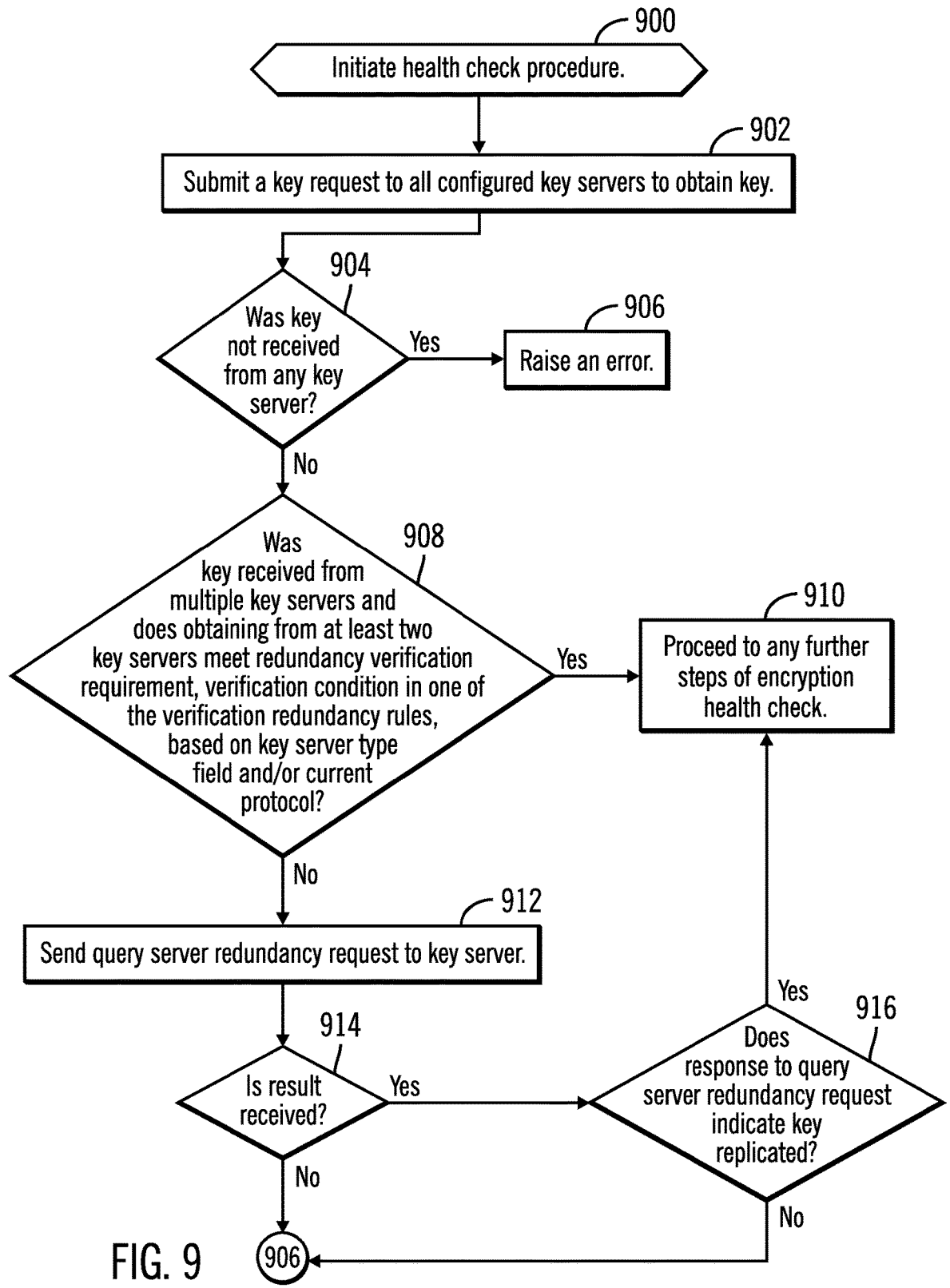
FIG. 9 illustrates an embodiment of operations to initiate a health check procedure of the key manager system.

FIG. 9 illustrates an embodiment of operations of a health check procedure 124 executed by the key manager 112 to perform a health check of the key server system 102, such as after the cold boot procedure 116. Upon initiating (at block 900) the health check procedure 124, a key request is submitted (at block 902) to the key server system 102 to obtain a key from all configured key servers at the key server system 102. If (at block 904) the requested key is not received from any of the redundant key servers, then an error is raised (at block 906). Health check notifications, such as raising the error at block 906, may be sent to the user via a communication protocol trap, such as Simple Network Management Protocol (SNMP), or through serviceable events being logged which the user can check on later by checking a service screen.

If (at block 904) the requested key is received from all key servers, then the key manager 112 determines (at block 908) whether the key is received from multiple redundant key servers and is a verification condition 304 in one of the verification redundancy status rules 300$_i$ is satisfied, based on the key server type field 406 and/or current protocol 404. For instance, the verification condition 304 may specify conditions for the key server type and/or protocol under which receiving requested keys results in a determination that the redundancy status is verified. If (at block 908) the verification condition 304 is satisfied, i.e., key server type 406 and/or 404 protocol condition satisfied when the requested key is obtained (at block 910) from at least two key servers, then control proceeds (at block 910) to any further steps of encryption health check.

If (at block 908) there is no verification condition 304 satisfied in one of the verification redundancy status rules 300, then the key manager 112 sends (at block 912) the query for redundancy information 308, indicated in the verification redundancy status rule 300$_i$ having the satisfied query condition 306, to the key server system 102. If (at block 914) a result to the query is received and if (at block 916) the response to the query server redundancy request indicates the key was replicated, i.e., there is key server redundancy at the key server system 102, then control proceeds to block 910 to proceed to any further steps of encryption health check. If (at block 914) the response to the query of server redundancy is not received or if (at block 916) the response to the query does not indicate the key is replicated, then control proceed to block 906 to raise an error.

With the embodiment of FIG. 9, the health check procedure determines whether the key server system 102 is properly replicating keys to provide redundancy at the key servers to assure the computational system 100 of redundancy to meet customer and system encryption requirements.

Figure 10:
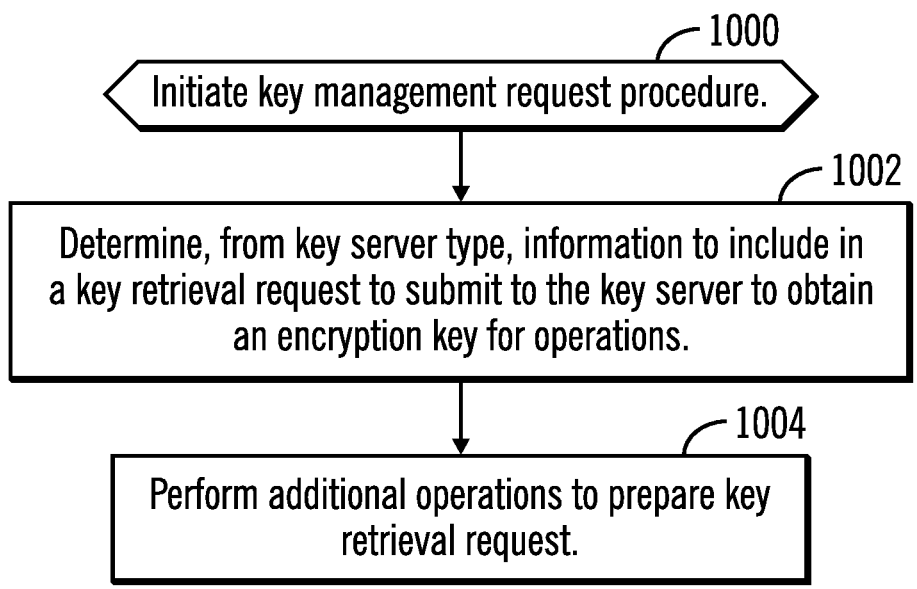
FIG. 10 illustrates an embodiment of operations to initiate a key management request procedure.

FIG. 10 illustrates an embodiment of a key management request procedure 126 executed by the key manager 112 to create a key management request, such as a request for an encryption key. Upon initiating (at block 1000) the key manage request procedure 126, the key manager 112 determines (at block 1002), from key server type 406, information to include in a key retrieval request to submit to the key server 112 to obtain an encryption key for operations. For example, if the key server type 406 indicates "IBM SKLM using KMIP", then the key manager 112 adds information to the key management request, such as device family, device group, and partner World Wide Network Name (WWNN) to a credential block of the key management operation request.

With the embodiment of FIG. 10, the key manager 112 may determine information to encode in a key management operation request based on the indicated key server type 406. Key server type 406 information is stored and maintained locally so the key manager 112 does not have to send a query request to the key server system 102 to obtain that information from the remote key server system 102.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 11:
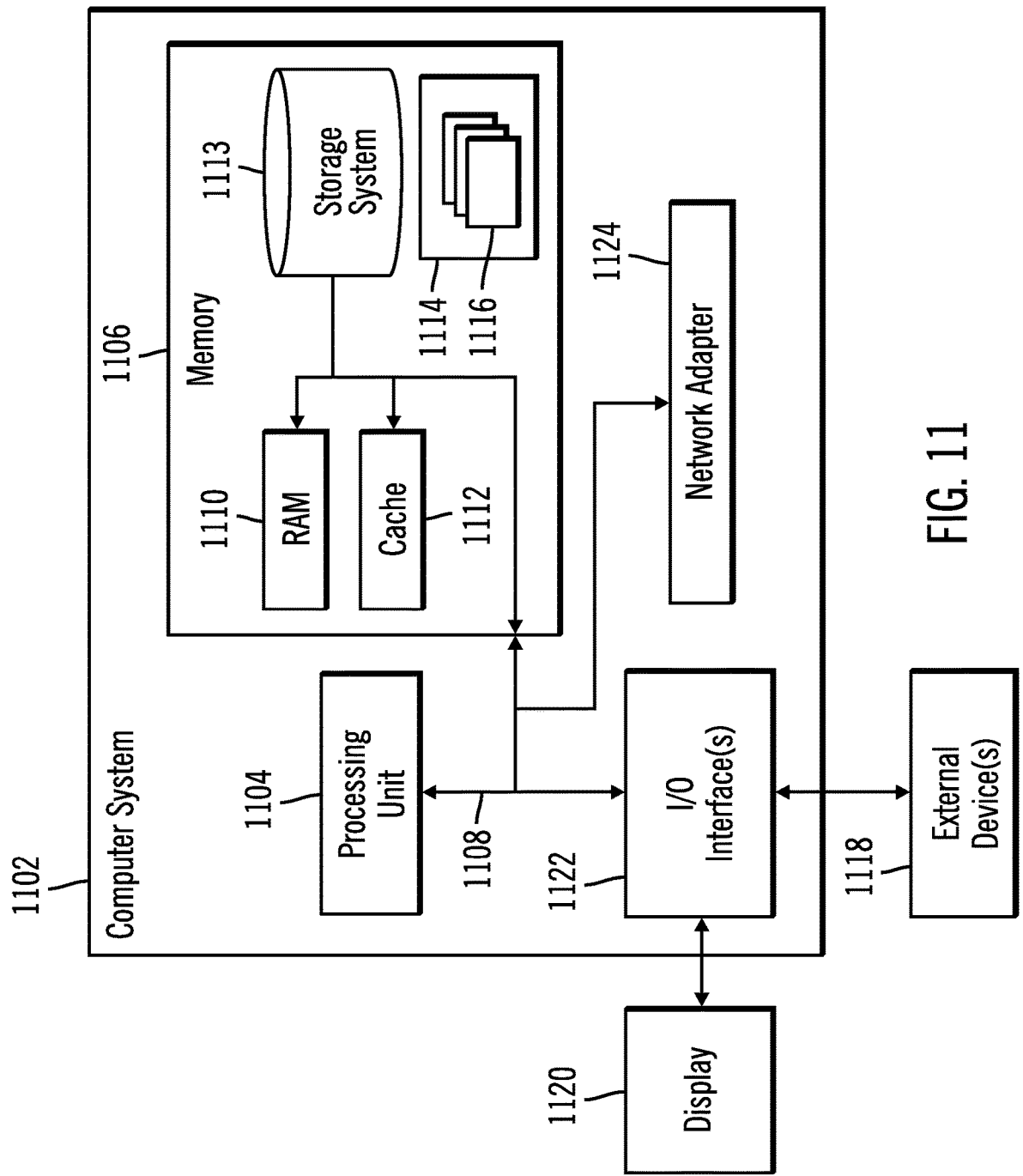
FIG. 11 illustrates a computing environment in which the components of FIG. 1 may be implemented.

The computational components of FIG. 1, including the computational system 100 and key servers in the key server system 102 may be implemented in one or more computer systems, such as the computer system 1102 shown in FIG. 11. Computer system/server 1102 may be described in the general context of computer system executable instructions, such as program modules, being executed by a computer system. Generally, program modules may include routines, programs, objects, components, logic, data structures, and so on that perform particular tasks or implement particular abstract data types. Computer system/server 1102 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 11, the computer system/server 1102 is shown in the form of a general-purpose computing device. The components of computer system/server 1102 may include, but are not limited to, one or more processors or processing units 1104, a system memory 1106, and a bus 1108 that couples various system components including system memory 1106 to processor 1104. Bus 1108 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 1102 typically includes a variety of computer system readable media. Such media may be any available media that is accessible by computer system/server 1102, and it includes both volatile and non-volatile media, removable and non-removable media.

System memory 1106 can include computer system readable media in the form of volatile memory, such as random access memory (RAM) 1110 and/or cache memory 1112. Computer system/server 1102 may further include other removable/non-removable, volatile/non-volatile computer system storage media. By way of example only, storage system 1113 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1108 by one or more data media interfaces. As will be further depicted and described below, memory 1106 may include at least one program product having a set (e.g., at least one) of program modules that are configured to carry out the functions of embodiments of the invention.

Program/utility 1114, having a set (at least one) of program modules 1116, may be stored in memory 1106 by way of example, and not limitation, as well as an operating system, one or more application programs, other program modules, and program data. Each of the operating system, one or more application programs, other program modules, and program data or some combination thereof, may include an implementation of a networking environment. The components of the computer 1102 may be implemented as program modules 1116 which generally carry out the functions and/or methodologies of embodiments of the invention as described herein. The systems of FIG. 1 may be implemented in one or more computer systems 1102, where if they are implemented in multiple computer systems 1102, then the computer systems may communicate over a network.

Computer system/server 1102 may also communicate with one or more external devices 1118 such as a keyboard, a pointing device, a display 1120, etc.; one or more devices that enable a user to interact with computer system/server 1102; and/or any devices (e.g., network card, modem, etc.) that enable computer system/server 1102 to communicate with one or more other computing devices. Such communication can occur via Input/Output (I/O) interfaces 1122. Still yet, computer system/server 1102 can communicate with one or more networks such as a local area network (LAN), a general wide area network (WAN), and/or a public network (e.g., the Internet) via network adapter 1124. As depicted, network adapter 1124 communicates with the other components of computer system/server 1102 via bus 1108. It should be understood that although not shown, other hardware and/or software components could be used in conjunction with computer system/server 1102. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

EXAMPLES

The following pertains to further embodiments.

Example 1 is a method for obtaining key server information to use to communicate with a key server and comprises determining whether a current protocol used to communicate with the key server comprises a first protocol or a second protocol. Indication is made in a key server type field of a first key server type for the first protocol in response to determining the current protocol comprises the first protocol. A query information request is submitted to the key server to determine a key server type in response to determining that the current protocol comprises the second protocol. In response to receiving a response to the query information request, a determination is made as to whether the response indicates a second key server type. Indication is made in the key server type field of the second key server type indicated in the response in response to the response indicating the second key server type. The first or second type of key server indicated in the key server type field is used to determine information to include in a key retrieval request to submit to the key server to obtain an encryption key to use for operations.

In Example 2, the subject matter of Example 1 can optionally include sending key requests to two key servers in response to the key server type field indicating the first key server type as part of a verification of key server redundancy; indicating verification of key server redundancy in response to obtaining the key from at least two key servers and the key server type field indicating the second key server type; sending a redundancy information request to the key server to request a redundancy status at the key server in response to the key server type field indicating the second key server type; and failing verification of the key server redundancy in response to not receiving keys in response to the key requests to the two key servers or from the redundancy information request not yielding a confirmation of key server redundancy.

In Example 3, the subject matter of Examples 1 and 2 can optionally include that the sending the key requests to two key servers is performed after indicating in the key server type field the first key server type or the second key server type.

In Example 4, the subject matter of Examples 1-3 can optionally include that the sending of the key requests for the verification of key server redundancy is performed as part of one of encryption enablement, a rekey operation to obtain a new encryption key, and a certificate update.

In Example 5, the subject matter of Examples 1-4 can optionally include indicating unknown in the key server type field in response to an encryption disablement operation.

In Example 6, the subject matter of Example 1-5 can optionally include: sending a get key request to configured key servers after indicating in the key server type field the first or second key server type; and indicating verification of key server redundancy in response to receiving a key from each of the configured key servers and determining one of whether the key server type is the first key server type and the current protocol comprises the second protocol.

In Example 7, the subject matter of Example 1-6 can optionally include that after indicating in the key server type field the first or second key server type, a query information request is submitted to the key server to determine key server redundancy status in response to determining that the current protocol comprises the first protocol. An error is indicated in response to a response to the query information request not indicating the key server redundancy status. Indication of an error is made in response to the response to the query information indicating that a key is not replicated to redundant key servers.

In Example 8, the subject matter of Example 1-7 can optionally include that the determining whether the current protocol comprises the first or second protocol, indicating in the key server type field the first key server type, submitting the query information request to the key server, determining whether the response indicates the second key server type, and indicating in the key server type field the second key server type are performed as part of execution of a cold boot procedure in which encryption is indicated as enabled. The key is obtained after indicating the first or second key server type in the key server type field. An encryption state is set to accessible in response to receiving the key in response to the key retrieval request. An encryption state is set to inaccessible in response to not receiving the key in response to the key retrieval request or in response to the response not indicating the second key server type.

Example 9 is a method for obtaining key server information to use to communicate with a key server. For each protocol of a plurality of protocols, a key server information rule is provided indicating an action to take to identify a key server for an associated protocol. A first key server information rule indicates a first key server type for a first protocol, and a second key server information rule indicates a submit query information request to a key server for a second protocol. The first key server type for the first protocol indicated in the first key server information rule is indicated in a key server type field in response to determining a current protocol used to communicate with the key server comprises the first protocol. A query information request is submitted to the key server indicated in the second key server information rule in response to determining that the current protocol comprises the second protocol. The first or second type of key server indicated in the key server type field is used to determine information to include in a key retrieval request to submit to the key server to obtain an encryption key to use for operations.

In Example 10, the subject matter of Example 9 can optionally include providing, for each key server type of a plurality of key server types, a verification redundancy status rule indicating a verification action to take to determine redundancy status of the key server, wherein a first verification redundancy status rule for a first key server type indicates that redundancy is verified in response to receiving a key from at least two key servers, and wherein a second verification redundancy status rule indicates to submit a request for redundancy information to the key server when the key server is indicated as the second key server type.

Example 11 is a system comprising one or more processors and one or more computer-readable storage media collectively storing program instructions which, when executed by the processor, are configured to cause the processor to perform the operations according to any of Examples 1 through 10.

Example 12 is a computer program product comprising one or more computer readable storage media, and program instructions collectively stored on the one or more computer readable storage media, the program instructions comprising instructions configured to cause one or more processors to perform the operations according to any one of Examples 1 through 10.

What is claimed is:

1. A computer program product for key server redundancy verification, wherein the computer program product comprises a computer readable storage medium having program instructions executable by a processor to cause operations, the operations comprising:
   sending a key request to a key server system to obtain a key from at least two redundant key servers;
   in response to receiving the requested key from the at least two redundant key servers, determining whether a key server configuration of the key server system satisfies a key server configuration condition in addition to receiving the requested key from the at least two redundant key servers;
   indicating redundancy verified, which indicates the key is obtained from at least two redundant key servers, in response to determining that the key server configuration condition is satisfied;
   sending a redundancy information request to the key server system to request a redundancy status in response to determining that the key server configuration condition is not satisfied; and indicating redundancy verified in response to a response to the redundancy information request indicating the key was replicated to at least two redundant key servers.

2. The computer program product of claim 1, wherein the operations further comprise:

indicating redundancy not verified in response to one of:
not receiving the key from the at least two redundant key servers in response to the key request;
the response to the redundancy information request not indicating the key was replicated to at least two redundant key servers; and
not receiving a response to the redundancy information request to the key server system.

3. The computer program product of claim 1, wherein the operations further comprise:

determining whether key server type information for a current protocol used to communicate with the key server system indicates a key server type;
setting a key server type field to the key server type indicated in the key server type information in response to determining that the key server type information for the current protocol used to communicate with the key server system indicates the key server type;
submitting a key retrieval request to the key server system for a new key; and
in response to receiving the new key from the key server system, performing the sending the key request to the key server system to obtain the key from at least two redundant key servers and determine whether redundancy is verified.

4. The computer program product of claim 1, wherein the operations further comprise:

determining whether key server type information for a current protocol used to communicate with the key server system indicates a key server type;
submitting a query information request to the key server system indicating a key server type in response to determining that the key server type information for the current protocol used to communicate with the key server system does not indicate the key server type;
in response to a response to the query information request, indicating the key server type, indicating the key server type from the response;
submitting a key retrieval request to the key server system for a new key; and
in response to receiving the new key from the key server system, performing the sending the key request to the key server system to obtain the key from at least two redundant key servers.

5. The computer program product of claim 1, wherein the sending the key request to the key server system to obtain the key from at least two redundant key servers is performed for one of a key server redundancy verification phase of encryption enablement, a rekey operation, or a certificate update procedure to determine a redundancy status at the key server system.

6. The computer program product of claim 1, wherein the key server configuration condition comprises a key server type condition, wherein the key server configuration satisfies the key server configuration condition in response to a key server type of the key server system satisfying the key server type condition, wherein satisfying the key server type condition indicates there is a redundancy if keys are retrieved from multiple key servers in the key server system.

7. The computer program product of claim 1, wherein the key server configuration condition comprises at least one of a key server type condition and a protocol condition, wherein the key server configuration satisfies the key server configuration condition in response to at least one of a key server type and a protocol of the key server system satisfying at least one of the key server type condition and the protocol condition, wherein satisfying the at least one of the key server type condition and the protocol condition indicates there is a redundancy if keys are retrieved from multiple key servers in the key server system.

8. A system for obtaining key server information to use to communicate with a key server system, comprising:

a processor; and
a computer readable storage medium having program instructions that when executed by the processor causes operations, the operations comprising:
sending a key request to the key server system to obtain a key from at least two redundant key servers;
in response to receiving the requested key from the at least two redundant key servers, determining whether a key server configuration of the key server system satisfies a key server configuration condition in addition to receiving the requested key from the at least two redundant key servers;
indicating redundancy verified, which indicates the key is obtained from at least two redundant key servers, in response to determining that the key server configuration condition is satisfied;
sending a redundancy information request to the key server system to request a redundancy status in response to determining the key server configuration condition is not satisfied; and
indicating redundancy verified in response to a response to the redundancy information request indicating the key was replicated to at least two redundant key servers.

9. The system of claim 8, wherein the operations further comprise:

indicating redundancy not verified in response to one of:
not receiving the key from the at least two redundant key servers in response to the key request;
the response to the redundancy information request not indicating the key was replicated to at least two redundant key servers; and
not receiving a response to the redundancy information request to the key server system.

10. The system of claim 8, wherein the operations further comprise:

determining whether key server type information for a current protocol used to communicate with the key server system indicates a key server type;
setting a key server type field filed to the key server type indicated in the key server type information in response to determining that the key server type information for the current protocol used to communicate with the key server system indicates the key server type;
submitting a key retrieval request to the key server system for a new key; and
in response to receiving the new key from the key server system, performing the sending the key request to the key server system to obtain the key from at least two redundant key servers and determine whether redundancy is verified.

11. The system of claim 8, wherein the operations further comprise:

determining whether key server type information for a current protocol used to communicate with the key server system indicates a key server type;

submitting a query information request to the key server system indicating a key server type in response to determining that the key server type information for the current protocol used to communicate with the key server system does not indicate the key server type;

in response to a response to the query information request indicating the key server type, indicating the key server type from the response;

submitting a key retrieval request to the key server system for a new key; and in response to receiving the new key from the key server system, performing the sending the key request to the key server system to obtain the key from at least two redundant key servers.

12. The system of claim 8, wherein the sending the key request to the key server system to obtain the key from at least two redundant key servers is performed for one of a key server redundancy verification phase of encryption enablement, a rekey operation, or a certificate update procedure to determine a redundancy status at the key server system.

13. The system of claim 8, wherein the key server configuration condition comprises a key server type condition, wherein the key server configuration satisfies the key server configuration condition in response to a key server type of the key server system satisfying the key server type condition, wherein satisfying the key server type condition indicates there is a redundancy if keys are retrieved from multiple key servers in the key server system.

14. The system of claim 8, wherein the key server configuration condition comprises at least one of a key server type condition and a protocol condition, wherein the key server configuration satisfies the key server configuration condition in response to at least one of a key server type and a protocol of the key server system satisfying at least one of the key server type condition and the protocol condition, wherein satisfying the at least one of the key server type condition and the protocol condition indicates there is a redundancy if keys are retrieved from multiple key servers in the key server system.

15. A method for obtaining key server information to use to communicate with a key server, comprising:

sending a key request to a key server system to obtain a key from at least two redundant key servers;

in response to receiving the requested key from the at least two redundant key servers, determining whether a key server configuration of the key server system satisfies a key server configuration condition in addition to receiving the requested key from the at least two redundant key servers;

indicating redundancy verified, which indicates the key is obtained from at least two redundant key servers, in response to determining that the key server configuration condition is satisfied;

sending a redundancy information request to the key server system to request a redundancy status in response to determining that the key server configuration condition is not satisfied, and indicating redundancy verified in response to a response to the redundancy information request indicating the key was replicated to at least two redundant key servers.

16. The method of claim 15, further comprising:

indicating redundancy not verified in response to one of:
not receiving the key from the at least two redundant key servers in response to the key request;
the response to the redundancy information request not indicating the key was replicated to at least two redundant key servers; and
not receiving a response to the redundancy information request to the key server system.

17. The method of claim 15, further comprising:

determining whether key server type information for a current protocol used to communicate with the key server system indicates a key server type;

setting a key server type field to the key server type indicated in the key server type information in response to determining that the key server type information for the current protocol used to communicate with the key server system indicates the key server type;

submitting a key retrieval request to the key server system for a new key; and in response to receiving the new key from the key server system, performing the sending the key request to the key server system to obtain the key from at least two redundant key servers and determine whether redundancy is verified.

18. The method of claim 15, further comprising:

determining whether key server type information for a current protocol used to communicate with the key server system indicates a key server type;

submitting a query information request to the key server system indicating a key server type in response to determining that the key server type information for the current protocol used to communicate with the key server system does not indicate the key server type;

in response to a response to the query information request indicating the key server type, indicating the key server type from the response;

submitting a key retrieval request to the key server system for a new key; and in response to receiving the new key from the key server system, performing the sending the key request to the key server system to obtain the key from at least two redundant key servers.

19. The method of claim 15, wherein the sending the key request to the key server system to obtain the key from at least two redundant key servers is performed for one of a key server redundancy verification phase of encryption enablement, a rekey operation, or a certificate update procedure to determine a redundancy status at the key server system.

20. The method of claim 15, wherein the key server configuration condition comprises a key server type condition, wherein the key server configuration satisfies the key server configuration condition in response to a key server type of the key server system satisfying the key server type condition, wherein satisfying the key server type condition indicates there is a redundancy if keys are retrieved from multiple key servers in the key server system.

21. The method of claim 15, wherein the key server configuration condition comprises at least one of a key server type condition and a protocol condition, wherein the key server configuration satisfies the key server configuration condition in response to at least one of a key server type and a protocol of the key server system satisfying at least one of the key server type condition and the protocol condition, wherein satisfying the at least one of the key server type condition and the protocol condition indicates there is a redundancy if keys are retrieved from multiple key servers in the key server system.

\* \* \* \* \*